June 5, 1928.

W. TIMSON 1,672,143

WEIGHING APPARATUS

Filed Aug. 29, 1927

Inventor:—
William Timson
by George E. Folkes.
his Attorney

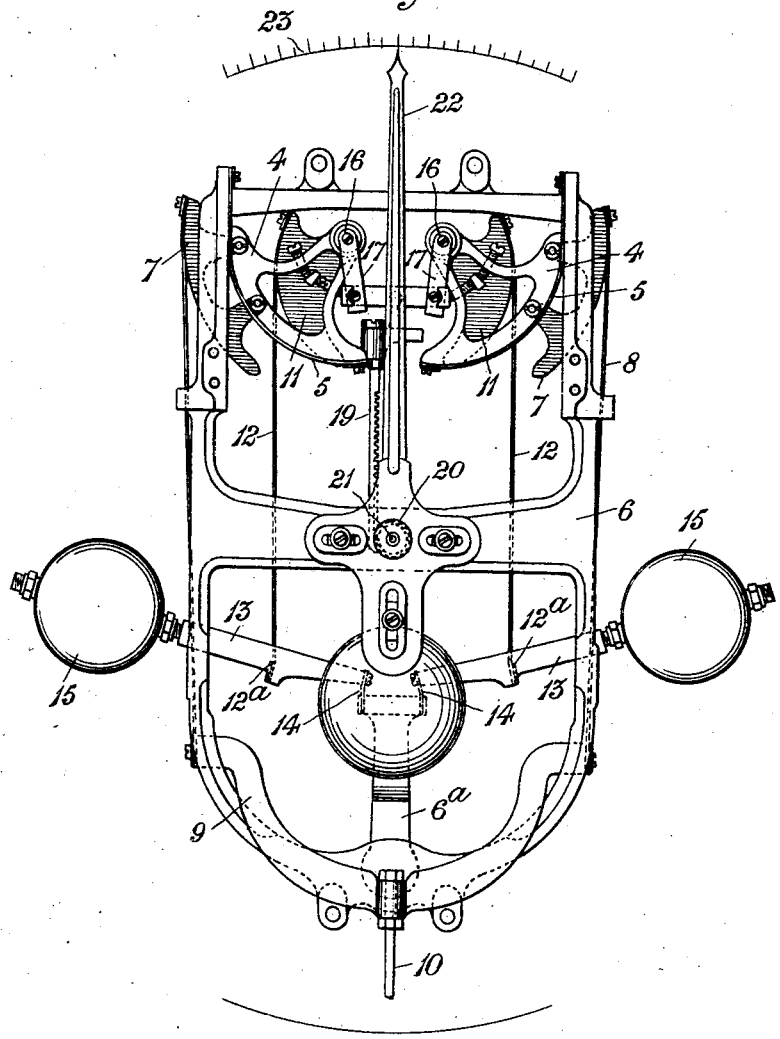

June 5, 1928.
W. TIMSON
1,672,143
WEIGHING APPARATUS
Filed Aug. 29, 1927
3 Sheets-Sheet 3
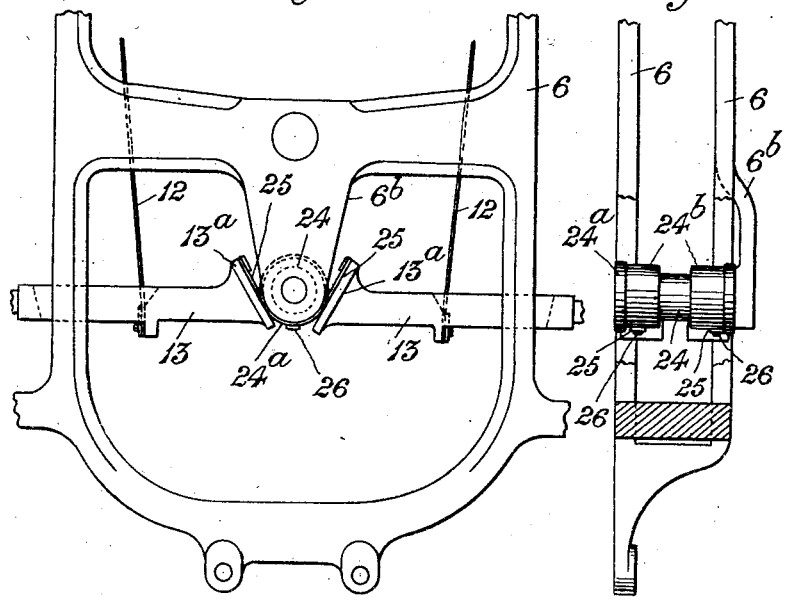
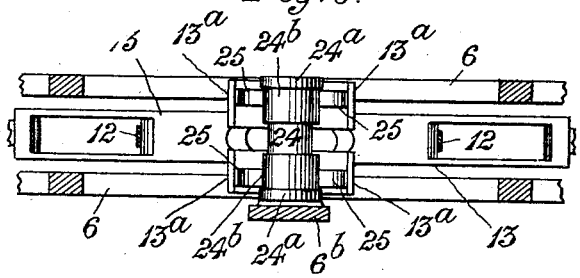
Inventor:—
William Timson
by George E. Folkes.
his Attorney Patented June 5, 1928.

1,672,143

UNITED STATES PATENT OFFICE.

WILLIAM TIMSON, OF BIRMINGHAM, ENGLAND, ASSIGNOR TO W. & T. AVERY LIMITED, OF BIRMINGHAM, ENGLAND.

WEIGHING APPARATUS.

Application filed August 29, 1927, Serial No. 216,276, and in Great Britain April 7, 1927.

This invention has reference to improvements in or relating to weighing apparatus and relates particularly to weighing apparatus of the kind wherein the pull of the load is transmitted to a resistant mechanism which is suspended by flexible ribbons from a fixed support so that upon application of a load the resistant mechanism moves bodily upwards.

In weighing apparatus of the aforesaid kind it has heretofore been proposed to employ a single pendulous resistant freely suspended by means of flexible ribbons from a pair of cam members which are co-axial with and fixed relatively to two additional sets of cam members. To one set of these additional cam members the pull of the load is transmitted through flexible ribbons and the cam members of the other additional set are secured to the lower ends of flexible ribbons which are attached at their upper ends to a fixed housing the said last mentioned set of cam members being adapted to roll up the suspension ribbons upon the application of a load to the weighing apparatus. The vertical displacement of the cam members is transmitted to a rack which meshes with a pinion mounted on a spindle to the end or ends whereof are attached a pointer or pointers adapted to register with a graduated chart or charts for affording an indication of the measure of the load.

It will be appreciated that in weighing apparatus of the kind specified it is desirable that the single pendulous resistant should have as small a range of movement as possible so as to avoid undesirable oscillation with its consequential deleterious effects on the accuracy of the indicating mechanism and in order to effect this purpose it has been proposed to group the several cam members of each set on the same sides of the vertical planes passing through the respective axes and further to make the peripheries of the cam members carrying the resistant and the cam members to which the load is applied eccentric relative to the peripheries of the suspension cam members which are concentric with the common axes.

Further, in order to ensure a true vertical displacement of the rack it has been proposed to pivotally connect the rack to a linkage which in turn has a pivotal connection to each set of cam members.

It is found possible, however, that under certain conditions of usage weighing apparatus of the kind last described may be objectionable by reason of the tendency to oscillation of the relatively heavy suspended pendulous resistant, and the present invention has for its object the provision of an improved form of weighing apparatus of the aforesaid kind wherein the advantages accruing from the arrangement of the cam members are retained and the disadvantages that may result from the employment of a single pendulous resistant obviated.

The invention consists of an improved weighing apparatus of the kind hereinbefore referred to characterized by the constitution of the major portion of the weighing resistant by a plurality of weighted levers which have connection with the respective set of cam members through the medium of flexible ribbons whereby the said levers are moved in correspondence with the vertical movement of the cam members occasioned by the application or removal of a load to and from the weighing apparatus. The invention also resides in the means of mounting the resistant levers.

The invention will now be described with particular reference to the accompanying sheet of drawings, wherein:—

Figure 3 is a similar view to Figure 1 shewing the resistant and indicating mechanism in the full load position.

Figure 4 is a front elevation illustrating a modified means of mounting the resistant levers.

Figure 5 is a part sectional end elevation of the modification seen in Figure 4, and Figure 6 is a part sectional plan view of the modification seen in Figure 4.

In the drawings like numerals of reference indicate similar parts in the several figures.

Figures 1, 2:
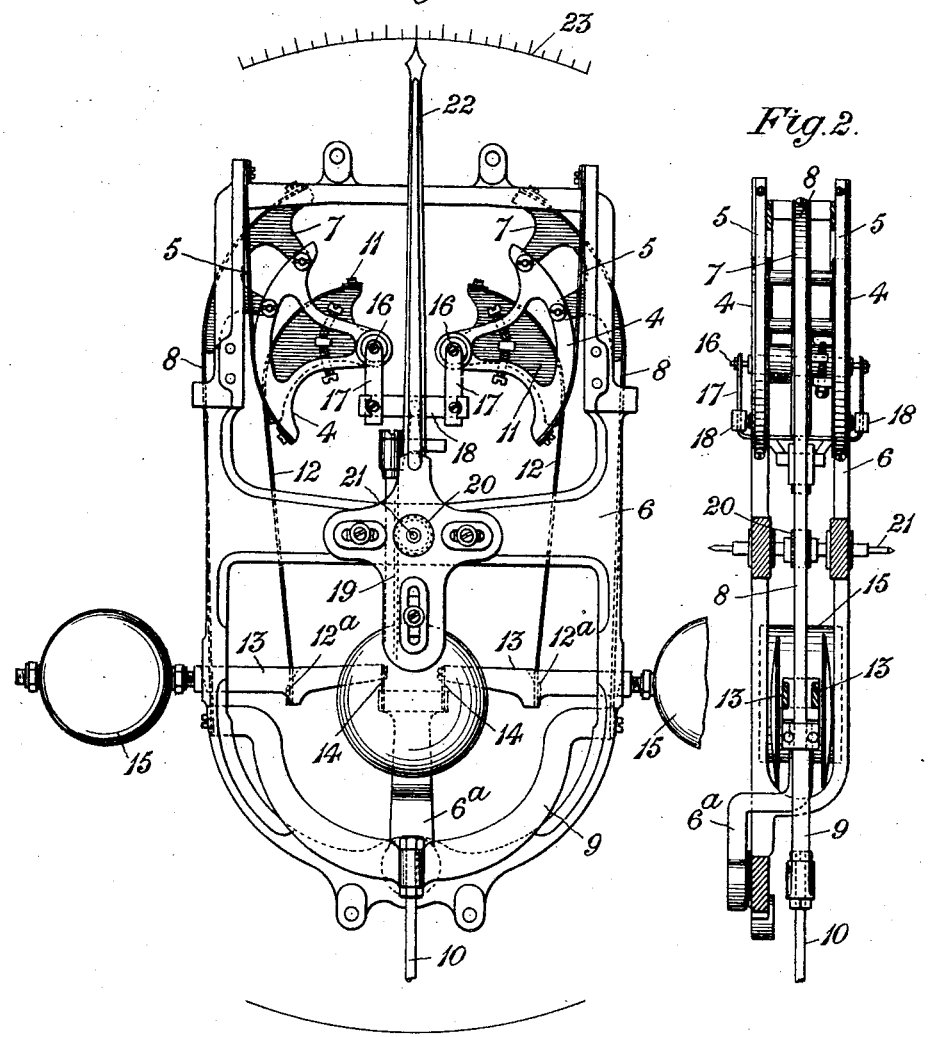
Figure 1 is a front elevation of sufficient of a weighing apparatus constructed in accordance with the invention as is necessary to an understanding of the invention, the resistant and indicating mechanism being shewn in the no load position.
Figure 2 is an end elevation, partly in section, of the mechanism seen in Figure 1.

A convenient embodiment of the invention will now be described in its application to a platform weighing machine of known construction. Two pairs of oppositely disposed cam members 4 are secured adjacent the lower ends of pairs of flexible ribbons 5 the other ends whereof are anchored to a fixed housing within which the mechanism as a whole is disposed. Co-axially mounted relative to the said cam members 4 are a second pair of cam members 7 to the upper ends of the peripheries whereof are attached the upper ends of a pair of flexible ribbons 8 the lower ends of which are secured to a yoke 9 which has connection with the draw rod 10 in connection with the bottom-work of the weighing machine, the said yoke serving to transmit the whole of the load to the resistant mechanism. Coaxial with the aforesaid pairs of cam members is a third pair of cam members 11 to the upper ends of the peripheries whereof are anchored the upper ends of a pair of flexible ribbons 12 the lower end of each of the said ribbons 12 being fixed to one of a pair of levers 13 which are secured at their inner ends to thin metal strips 14 which in turn are fixed to a lug $6^a$ forming part of or being secured to the housing 6 said strips 14 constituting the fulcra of the levers 13. The points of connection $12^a$ of the bands 12 to the levers 13 are disposed intermediate the ends of the levers said levers having weights 15 adjustably mounted on the outer ends thereof.

Axially disposed relatively to each set of cam members is a spindle 16 said spindles 16 being pivotally connected to the upper ends of links 17 the lower ends whereof have a pivotal connection with a cross bar 18 which in turn has a pivotal connection to a rack bar 19 which meshes with a pinion 20 keyed on a spindle 21 mounted in bearings formed in the housing. This spindle 21 has secured on the end or ends thereof a pointer or pointers 22 which register with a graduated chart 23 or charts for the purpose of indicating a measure of the load.

Each set of cam members 4, 7 and 11 is grouped on the same side of the vertical planes passing through the respective axes and the peripheries of the load transmission cam members 7 and of the resistant carrying cam members 11 are eccentrically disposed relatively to the peripheries of the suspension cam members 4 which are concentrically disposed about the respective axes. The peripheries of the resistant cam members 11 are such that the locii of the flexible bands connected thereto remain in the same linear paths.

It will be appreciated that upon the bodily vertical movement of the cam members 4, 7 and 11 due to the application or removal of a load the said movement is translated by the ribbons 12 to the levers 13 and effects an oscillation thereof in correspondence with the magnitude of the load applied or removed.

Moreover, as the arrangement and formation of the cam members hereinbefore mentioned entails only a small vertical movement of the bands 12 secured to the resistant carrying cams the lever resistants 13 are only oscillated through a relatively small arc. In addition, the eccentric disposition of the peripheries of the resistant cam members 11 relatively to the common axes ensures that the moments of the levers shall remain constant.

In the modified construction seen in Figures 4–6 instead of anchoring the levers 13 to flexible strips 14 each lever is formed with a pair of inclined plane faces $13^a$ which are adapted to bear against the raised ribs $24^a$ formed adjacent the ends of a cylindrical drum 24 which is bolted to a bracket $6^b$ carried from the framing 6. Intermediate the said ribs $24^a$ the drum is provided with reduced sections $24^b$ within which work a pair of flexible bands 25 the ends whereof are clamped to the upper ends of the plane faces $13^a$. Each of the said bands 25 passes under and around the lower portion of the periphery of the reduced sections $24^b$ of the drum 24 and in order to prevent a slipping of the bands the said ribbons are provided at their central point with apertures which co-operate with pegs 26 which project downwardly from the periphery of the drum.

In operation the plane faces of the peripheries bear and turn against the periphery of the ribs $24^a$ as permitted by the supported bands 25 and it will be appreciated that by reason of the relatively small area of the contacting surfaces the friction obtaining between the drum and the plane faces on the levers is reduced to a negligible amount. In addition, by recessing the periphery of the drum the bands are permitted to work with complete freedom of movement.

What I claim is:—

1. A weight indicating and resistant mechanism for use in connection with weighing apparatus comprising a housing, a plurality of cam-like suspension members, a plurality of flexible ribbons secured at their upper ends to said housing and at their lower ends to the peripheries of the cam-like suspension members, a pair of resistant carrying cam-like members fixed relatively to the suspension cam-like members and having their peripheries eccentrically disposed relatively to the peripheries of the suspension cam-like members, a pair of weighted levers adapted to constitute a part of the weighing resistant, a pair of flexible ribbons anchored at their upper ends to the peripheries of the resistant cam-like members and at their lower ends to said levers, a pair of load carrying cam-like members fixed relatively to the suspension and resistant carrying cam-like members, flexible ribbons anchored at their upper ends to the peripheries of said load-carrying cam-like members, means connected to the lower ends of said last mentioned ribbons for transmitting the pull of the load to said flexible ribbons, an indicating mechanism and means connected with said cam-like members for actuating the said indicating mechanism.

2. An indicating and resistant mechanism for use in connection with weighing apparatus comprising a housing, two pairs of cam-like suspension members disposed on opposite sides of the longitudinal axis of said housing, pairs of flexible ribbons secured at their upper ends to said housing and at their lower ends to the peripheries of the cam-like suspension members, a resistant carrying cam-like member fixed relatively to each pair of cam-like suspension members and having its periphery eccentrically disposed relatively to the peripheries of the cam-like suspension members, a pair of weighted levers adapted to constitute a portion of the weighing resistant, a pair of flexible ribbons anchored at their upper ends to the periphery of the resistant carrying cam-like members and at their lower end to said levers, a load carrying cam-like member secured relatively to each pair of cam-like suspension members and having its periphery eccentrically disposed relative to the peripheries of the cam-like suspension members, each set of cam-like members being co-axially disposed and arranged on the same side of the vertical planes passing through the common axes, flexible ribbons connected at their upper ends to the load carrying cam-like members, means connected to the lower ends of said last mentioned ribbons for transmitting the pull of the load to said ribbons, an indicating mechanism and means connected with said cam-like members for actuating the said indicating mechanism.

3. A weight indicating and resistant mechanism for use in connection with weighing apparatus comprising a housing, a plurality of cam-like members, a plurality of flexible ribbons secured at their upper ends to said housing and at their lower ends to the peripheries of said cam-like suspension members, a pair of resistant carrying cam-like members fixed relatively to the cam-like suspension members and having their peripheries eccentrically disposed relatively to the peripheries of the cam-like suspension members, a pair of weighted levers adapted to constitute the major portion of the weighing resistant, a pair of flexible ribbons anchored at their upper ends to the peripheries of the resistant cam-like members and at their lower ends to said levers, a pair of load carrying cam-like members fixed relatively to the suspension and resistant carrying cam-like members and having the peripheries thereof eccentrically disposed relatively to the peripheries of the cam-like suspension members, flexible ribbons anchored at their upper ends to the peripheries of said load carrying cam-like members, means connected to the lower ends of said last mentioned ribbons for transmitting the pull of the load to said ribbons, an indicating mechanism, a pair of spindles co-axially arranged relatively to the cam-like members, a linkage pivotally suspended from said spindles, a rack bar pivotally supported from said linkage, a weight indicator and a pinion secured relatively to said weight indicator and adapted to mesh with and be actuated by said rack bar.

4. An indicating and resistant mechanism for use in connection with weighing apparatus comprising a housing, two pairs of cam-like members disposed on opposite sides of the longitudinal axis of said housing, pairs of flexible ribbons secured at their upper ends to said housing and at their lower ends to the peripheries of the cam-like suspension members, a resistant carrying cam-like member fixed relatively to each pair of suspension carrying cam-like members, and having its periphery eccentrically disposed relatively to the peripheries of the cam-like suspension members, a pair of weighted levers adapted to constitute the major portion of the weighing resistant, a pair of flexible ribbons anchored at their upper ends to the periphery of the resistant carrying cam-like members and at their lower ends to said levers, a load carrying cam-like member secured relatively to each pair of cam-like suspension members and having its periphery eccentrically disposed relative to the periphery of the cam-like suspension members each set of cam-like members being co-axially disposed and arranged on the same side of the vertical plane passing through the common axes, flexible ribbons connected at their upper ends to the load carrying cam-like members, means connected to the lower ends of said ribbons for transmitting the pull of the load to said ribbons, an indicating mechanism, a pair of spindles co-axially arranged relative to each of the cam-like members, a linkage pivotally suspended from said spindles, a rack bar pivotally supported from said linkage, a weight indicator, a pinion secured relatively to said weight indicator and adapted to mesh with and be actuated by said rack bar.

5. A weight indicating and resistant mechanism for use in connection with weighing apparatus, comprising a housing, a plurality of cam-like suspension members, a plurality of flexible ribbons secured at their upper ends to said housing and at their lower ends to the peripheries of the said cam-like suspension members, a pair of resistant carrying cam-like members fixed relatively to the cam-like suspension members and having their peripheries eccentrically disposed relatively to the peripheries of the cam-like suspension members, a pair of weighted levers adapted to constitute the major portion of the weighing resistant, a support carried by said housing, flexible members secured to said support and to said levers, said flexible ribbons constituting the pivot for said levers, a pair of flexible ribbons anchored at their upper ends to the peripheries of the said resistant cam-like members and at their lower ends to said levers, a pair of load carrying cam-like members fixed relatively to said suspension and resistant carrying cam-like members, flexible ribbons anchored at their upper end to the peripheries of said load carrying cam-like members, means connected to the lower ends of said last mentioned ribbons for transmitting the pull of the load to said flexible ribbons, an indicating mechanism and means connected with said cam-like members for actuating the said indicating mechanism.

In testimony whereof, I have signed my name to this specification.

WILLIAM TIMSON.